(12) United States Patent
Luyckx et al.

(10) Patent No.: US 6,350,295 B1
(45) Date of Patent: Feb. 26, 2002

(54) METHOD FOR DENSIFYING ALUMINUM AND IRON BRIQUETTES AND ADDING TO STEEL

(75) Inventors: Leon A. Luyckx, Ouray, CO (US); Clayton A. Bulan, Munster, IN (US)

(73) Assignee: Clayton A. Bulan, Jr., Munster, IN (US)

( * ) Notice: Subject to any disclaimer, the term of this patent is extended or adjusted under 35 U.S.C. 154(b) by 0 days.

(21) Appl. No.: 09/887,752

(22) Filed: Jun. 22, 2001

(51) Int. Cl.$^7$ ................................................ C21C 7/06
(52) U.S. Cl. .......................................... 75/568; 75/315
(58) Field of Search ........................ 75/568, 567, 315, 75/316, 436

(56) References Cited

U.S. PATENT DOCUMENTS

| | | |
|---|---|---|
| 3,368,885 A | 2/1968 | Volianik |
| 3,459,537 A | 8/1969 | Hornak |
| 3,645,720 A | 2/1972 | Imai et al. |
| 3,649,253 A | 3/1972 | Kaess |
| 3,702,151 A | 11/1972 | DeBlok et al. |
| 3,766,961 A | 10/1973 | Bunting, Jr. et al. |
| 3,769,004 A | 10/1973 | Barnhardt et al. |
| 3,771,584 A | 11/1973 | Wojcik |
| 3,793,000 A | 2/1974 | Miltenberger |
| 3,822,735 A | 7/1974 | Miltenberger et al. |
| 3,861,906 A | 1/1975 | Tipnis et al. |
| 3,917,240 A | 11/1975 | Tanoue et al. |
| 3,951,645 A | 4/1976 | Luyckx et al. |
| 3,953,198 A | 4/1976 | Easwaran et al. |
| 3,961,663 A | 6/1976 | Degois et al. |
| 3,998,625 A | 12/1976 | Koros |
| 4,036,635 A | 7/1977 | Klapdar et al. |
| 4,060,407 A | 11/1977 | Jackman |
| 4,066,444 A | 1/1978 | Kosmider |
| 4,084,799 A | 4/1978 | Coward et al. |
| 4,086,086 A | 4/1978 | Dawson et al. |
| 4,173,466 A | 11/1979 | Mclaughlin et al. |
| 4,220,191 A | 9/1980 | Fogarty |
| 4,233,064 A | 11/1980 | Dunn, Jr. |
| 4,298,050 A | 11/1981 | Ohashi et al. |
| 4,303,118 A | 12/1981 | Coward |
| 4,313,758 A | 2/1982 | Henning et al. |
| 4,330,024 A | 5/1982 | Wallace |
| 4,341,554 A | 7/1982 | Koros et al. |
| 4,472,196 A | 9/1984 | Argyropoulos et al. |
| 4,497,661 A | 2/1985 | Valenti |
| 4,582,112 A | 4/1986 | Mack |
| 4,695,318 A | 9/1987 | Knauss, Jr. et al. |
| 4,801,328 A | 1/1989 | Canfield |
| 4,921,533 A * | 5/1990 | Jackson ........................ 75/568 |
| 4,995,907 A | 2/1991 | Pirkbauer |
| 5,085,691 A | 2/1992 | Nakonechny et al. |
| 5,378,261 A | 1/1995 | Aizatulov et al. |
| 5,397,379 A | 3/1995 | Barker et al. |
| 5,417,740 A | 5/1995 | Galperin et al. |
| 5,698,009 A * | 12/1997 | Min et al. ...................... 75/315 |
| 6,024,777 A | 2/2000 | Houser et al. |
| 6,120,577 A | 9/2000 | Koros et al. |

* cited by examiner

*Primary Examiner*—Melvyn Andrews
(74) *Attorney, Agent, or Firm*—Buckingham, Doolittle & Burroughs, LLP

(57) ABSTRACT

The invention relates to a process to minimize metallic aluminum fines loss to parasitic reactions during their introduction into the tap stream of molten steel from Basic Oxygen Furnaces or Electric Arc Furnaces in the ladle, or at the secondary steelmaking vessel, by premixing oxide-free steel or iron fines, prior to briquetting, increasing the apparent density of the aluminum-containing briquette thereby decreasing its flotation into the highly oxidized slag and minimizing the aluminum losses and increasing predictability in the molten steel properties.

20 Claims, 1 Drawing Sheet

METHOD FOR DENSIFYING ALUMINUM AND IRON BRIQUETTES AND ADDING TO STEEL

TECHNICAL FIELD

The invention relates to a method and composition for densifying aluminum additives, by compaction of aluminum (Al) and iron (Fe) fines into a physical form such as a briquette, thereby reducing aluminum losses to the tap slag and improving residual aluminum control during primary deoxidation of liquid steel in the ladle.

BACKGROUND OF THE INVENTION

Generally, molten steel resulting from converting a combination of molten iron and scrap steel in a basic oxygen furnace or electric arc furnace has to be deoxidized prior to its solidification in ingots or in continuously cast shapes. Such deoxidation occurs mainly in the steel ladle during tapping from the furnace or somewhat later at the ladle metallurgy station. Deoxidation is for the purpose of reducing the dissolved oxygen content of the molten steel to a predetermined and measurable narrow range required by the ultimate quality of the steel product. This implies the addition to the molten steel of specified amounts of deoxidizing agents such as carbon, manganese, silicon and aluminum generally used in combination. In addition to their deoxidizing function, these same elements may be added also for the purpose of forming an alloy with the steel to thereby alter the physical and mechanical properties of the latter. Several other, more expensive elements added to molten steel for alloying purposes, such as boron, vanadium, niobium, titanium and calcium, may also offer deoxidizing power but they are generally protected from being wasted to that function by introduction only after the dissolved oxygen has been reduced by at least two (2) of the elements cited, C, Mn, Si and Al.

Until the introduction of continuous casting and the almost compete conversion from ingot casting to "strand" casting around 1985, oxygen was one of the allies of the steelmaker. By controlling the carbon/oxygen balance, using little deoxidation except the specified carbon and manganese and occasionally some silicon and very little aluminum during ingot teeming, steelmakers produced well over 75% of all steel world-wide as good quality "rimming" steel ingots. The carbon monoxide (CO) gas developed by the carbon/oxygen reaction during solidification was "rimmed out" leaving no porosity in the clean, virtually inclusion-free surface layers of these ingots, while most internal porosities trapped by the final solidification were sealed without trace by the hot rolling process.

Unfortunately, rimming is not applicable to continuous casting because the high speed of solidification overtakes the upward flow of CO bubbles, entrapping large amounts of porosity in subsurface layers of as-cast steel. Today, over 95% of all steel is continuously cast, and it is "killed" as opposed to "live" or rimming. As the terms are used in this application, "killed" or deoxidized state means that the amount of "free" or dissolved oxygen contents have dropped from 150–400 ppm oxygen typical of rimmed steels down to 20–50 ppm oxygen in silicon and manganese killed (SiK) "long" steel products representing some 40% of total steel production. Free oxygen is further reduced down to the 0.1–5 ppm range in aluminum (Al) killed or AK "flat-rolled" products, about 60% of all steels. From the one-to-two order of magnitude difference in free oxygen resulting from aluminum and manganese (Al/Mn) as compared to silicon and manganese (Si/Mn) deoxidation, it is clear that Al/Mn vastly outperforms Si/Mn for full deoxidation and total absence of CO porosity.

However, even with superior deoxidation power, aluminum is not used on all strand cast steels because the products of aluminum deoxidation are alumina and aluminate spinel inclusions, which are solid at the steelmaking temperature of 3000° F. It is known that solid inclusions passing through the narrow tundish-to-mold metering nozzles tend to clog these refractory nozzles and to shut down the whole casting operation. This is particularly prevalent with the smaller nozzles used for billet, bloom and "dogbone" casting sections of the long products group of which only a small fraction, the Special Bar Quality (SBQ) subgroup may use a little aluminum "sacrificially," typically about 1 lb/ton to prevent porosity while avoiding nozzle blockage. With the very large, oversized nozzles used for the large sections of slab casting of flat steel products, the alumina build-up problem is not sufficiently severe to prevent full aluminum deoxidation. Thus, flat product steels are virtually all aluminum deoxidized or Aluminum Killed (AK) using between 2 and 7 lb aluminum per ton of steel. The minimum amount of aluminum needed to deoxidize molten steel tapped from the furnace can be estimated as follows: the dissolved oxygen content of the steel before deoxidation varies typically from 600 to 1200 ppm. The deoxidation reaction is $2 Al + 3/2\ O_2 = Al_2O_3$. Converting this into approximate weights: $2 \times 27 + 3 \times 16 = 102$. This means that, for the reaction to be completed, 48 weight units of oxygen require 54 weight units of aluminum. Thus, 600 ppm O require 675 ppm Al, and 1200 ppm O require 1350 ppm Al. As 500 ppm equal one pound per ton, the minimum amount of aluminum required to deoxidize steel is 1.35 to 2.7 lb per ton. On the one hand, manganese and carbon take some share of the deoxidation work which reduces the need for Al by 0.5 to 1 lb per ton. On the other hand, most steels require a retained or residual Al content of 0.025 to 0.050% corresponding to an additional ½ to 1 lb per ton. In short, the minimum amount of aluminum required for the large group of low carbon AK steels is about 2 lbs per ton if no parasitic losses are encountered.

When fully deoxidizing with aluminum at tap, the average usage of aluminum is approximately 5 lb/ton, of which it is believed, without being held to any one particular theory or mode of operation, about 3 lb/ton are lost to slag (90%) and air (10%). Thus 2.7–2.9 lb aluminum per ton are lost to parasitic reactions with the slag involuntarily transferred with the molten steel tapping from the furnace.

Both Basic Oxygen Furnace (BOF) and Electric Arc Furnace (EAF) slags result from oxidizing carbon (C), Silicon (Si), manganese (Mn), and even some iron (Fe) to purify hot metal (BOF) and scrap (EAF), to achieve steel specifications and to raise the temperature to 3,000° F. required at tap. Only carbon leaves the melt as carbon monoxide (CO) gas. Some of it may stay in the slag but only as entrapped bubbles. The other elements form oxides, e.g., silicon dioxide ($SiO_2$), manganese oxide (MnO), iron oxide (FeO), etc., which are fluxed to a liquid phase by the proper amount of burnt lime/dololime (CaO+MgO) and form a fluid slag which is poured in a slag pot after the steel is tapped out.

Typical chemical compositions of this furnace slag from a normal BOF or EAF melting and oxidizing process are as follows (in weight percent).

Cpd. GaO $SiO_2$ MgO $Al_2O_3$ FeO MnO $P_2O_5$ $Cr_2O_3$ $TiO_2$ $Na_2O$ $K_2O$

Wt.% 45 15 12 1.5 18 6 1.5 0.3 0.4 0.2 0.1

Typical aluminum consumption for such process is 4 lb/ton (loss 2 lb/ton).

Typical chemical compositions of this furnace slag from a highly energized EAF feeding a modern thin slab casting plant, are as follows (in weight percent).

Cpd. CaO $SiO_2$ MgO $Al_2O_3$ FeO MnO $P_2O_5$ $Cr_2O_3$ $TiO_2$ $Na_2O$ $K_2O$

Wt.% 27 11 9 1.0 45 5 1.0 0.6 0.3 0.1

Typical aluminum consumption for such process is 6.5 lb/ton (loss 4.5 lb/ton).

The percentage of FeO is the major difference between the two slags, directly causing the difference in aluminum losses. The parasitic reaction, reducing the FeO of the slag by aluminum is strongly exothermic, thus resulting in the following:

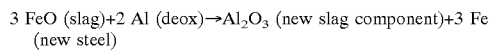

3 FeO (slag)+2 Al (deox)→$Al_2O_3$ (new slag component)+3 Fe (new steel)

Similar, but less exothermic reactions occur with MnO, $SiO_2$, $P_2O_5$, $Cr_2O_3$, $TiO_2$ and the alkalis and all contribute to aluminum losses. However, the reaction between Al and FeO represents 60–90% of all of the aluminum losses during tap, depending on the relative FeO content as illustrated by the slag chemistry.

One of the first efforts at reducing deoxidation aluminum loss involved reducing the parasitic oxidation of the aluminum by air, using for example, argon or nitrogen gas shrouding the entire ladle. This effort was essentially unsuccessful. It was only when the focus centered on the slag that aluminum losses started to decrease. Involuntarily carried over from the Basic Oxygen Furnace (BOF) or Electric Arc Furnace (EAF), the slag covers the steel in the ladle since the very first seconds of the tapping process that lasts from 2–12 minutes. Unless special devices are in place, the very first liquid to hit the bottom of the ladle is not steel, but slag, setting the stage for high aluminum losses and other chemistry control problems. The largest part of the volume of slag carried over comes toward the end of the tap, when steel and slag are entrained together through the tap hole in a vortexing manner. Since about 1990, the focus has been to prevent the parasitic (FeO+MnO) reaction, and polluting ($SiO_2$+ $P_2O_5$+$Cr_2O_3$. . . ) reactions forming oxides, from furnace slag transfer to the ladle, has received serious attention from both steel producers and suppliers of slag retention devices. Competition between various designs such as balls, pyramids, or darts and more sophisticated systems (EBT, photocells) has resulted in reducing the volume of slag transfer by as much as 80–90%.

Benefits have included aluminum savings on the order of 0.5–1 lb/ton, and also improved manganese recovery and iron yield. The main advantage with today's tightening steel chemistry specifications, are much improved control of aluminum and reduced "pick-up" of pollutants Si, P, Cr, Ti, Cr, . . . by the liquid steel. However, aluminum savings from furnace carry-over slag control, while contributing to justify the cost of the devices, comes short of the potential 2–4.5 lb/ton to be saved toward the theoretical minimum.

Traditionally, essentially pure metallic aluminum has been the most common form of aluminum deoxidizing agent used in the steelmaking process, in any convenient form such as notch bars, small ingots, shot and chopped wire. The use of essentially pure aluminum presents some significant disadvantages, however, arising primarily from its low density as compared to the molten steel to which the aluminum is added. The density of liquid aluminum at steelmaking temperatures of approximately 1600° C. is only about 2 grams (g) per cubic centimeter (cc), whereas the density of molten steel at the same temperature is greater than 7 g/cc. Therefore, when aluminum is added to the melt, it will float at the steel/slag interface, where the aluminum rapidly oxidizes, with relatively small amounts of the aluminum actually making contact with the molten steel. The efficiency of the aluminum as a deoxidizing agent is thus limited by the rate at which oxygen in the melt can diffuse upward to the slag/steel interface, and deoxidation performance is erratic.

The more successful approaches toward deox Al savings came from the suppliers and can be summarized as reducing or eliminating contact between deox Al and ladle slag. For the purpose of this invention, these approaches can be considered more or less specifically as Prior Art.

The first group, called "plungers" or "dunkers" consists of hanging from the small hoist of the ladle crane a scrap steel bloom holding at its tip either a canister full of deox Al (Pierce cage, 1965–85) or a cast ring of deox Al (MSSI, 1985–95), to fit around the bottom of the bloom. After the tap, the ladle full of steel with slag on top, the bloom is lowered at once and quickly forced through the slag layer. Al starts melting and dissolving in the liquid steel only when it is at least a foot below the slag-metal line. Despite large Al savings of the order of 1.5 to 2.5 lb/ton and much better Al chemistry control, steel producing management gave up on the dunkers which were very unpopular with melters because of the additional work and attention to detail required.

The evolutive breakthrough from this group was solid aluminum wire, ½ in diameter, feeding through the ladle slag, which is not applicable to tapping conditions but is the most accepted form of deoxidation aluminum for delayed aluminum deoxidation and chemistry adjustment at the Ladle Metallurgical Furnace (LMF). Only nominally more expensive than ingot-type deoxidation aluminum, the vertical downward pushing of a ½ wire of solid aluminum from a continuous coil accomplishes the submergence below the slag of the ladle plungers and yields very high recoveries on the order of 90% and better. In addition, it allows simple and precise metering of the addition needed to the final aluminum content required by the specifications. Other alloying elements, C, S, Nb, V, Ti, B, . . . are also "wired in" at the LMF today for high yield and precision of chemistry.

Another approach introduced by the Japanese refractory producers, consisted of pushing the slag layer toward the side of the ladle during and after tap by strong argon bubbling through a plug in the ladle bottom and of maintaining the steel meniscus clean of slag by lowering a refractory ring floating on the steel to keep the slag out. All the ferroalloy and aluminum additions are then made with much improved recoveries. Briefly tried in the United States, it was abandoned due to the complexity of implementation.

Ferroaluminum has also been used as a deoxidation additive as a 35–38% aluminum/65–62% iron alloy, the only narrow range on the entire Fe—Al binary diagram suitable for use a deoxidation aluminum. This range supplies the desired combination of stability (no decrepitation below 40 and above 75% aluminum), density (about 2.5 times that of pure aluminum and not cost-effective to be on the Al-rich side of the binary diagram), and resistance to oxidation (below 34% aluminum, the alloy rusts like regular iron). Produced in large induction melting furnaces from aluminum scrap and low carbon steel scrap, the alloy is both moldable into popular deoxidation aluminum shapes and crushable to suitable sizes. Instead of the typical 4.5 lb/ton needed with regular deoxidation aluminum ingots at 95–99% aluminum, only 2–2.5 lb contained aluminum per ton are needed with 35% ferroaluminum which translates into 5.7–7.1 lb of the alloy per ton of liquid steel tapped. The density of ferroaluminum is about twice the density of pure aluminum, resulting in deeper penetration of the ferroaluminum oxidizing agent into the molten steel. Because of the deeper penetration, resulting in improved contact between the deoxidizing agents and the molten steel, ferroaluminum does produce an improved deoxidation efficiency in comparison to aluminum alone but still suffers from certain disadvantages. The melting and casting costs of the alloy became such that 35% aluminum cost almost as much per pound as 98% aluminum. The aluminum units saved were insufficient to cover the additional cost of aluminum in the alloy. Still used on a limited scale, mostly for adjustments at the LMF instead of wire, the 35% aluminum ferroalloy has been abandoned as deoxidation aluminum replacement at tap for AK steels.

Another technique to densify deoxidation aluminum is taught by U.S. Pat. No. 4,801,328 and consists mainly of casting molten secondary aluminum around precut reinforcing steel bars in notch bar molds. The major advantage of this invention over the ferroaluminum alloy was the reduced cost of production, requiring only, at the secondary aluminum remelting plant, to insert precut rebar steel pieces into the notch bar molds prior to casting the liquid aluminum. Another advantage is the flexibility in selecting the desired aluminum to iron ratio for best performance which is reported to be about equal to that of the ferroaluminum alloy, but at lower aluminum unit cost. It was invented more specifically for the long products group to improve control of the sacrificial aluminum addition prior to Si/Mn deoxidation at tap. It has not however, penetrated the much larger flat-rolled AK steel market for deoxidation aluminum. A major cause of this failure is the 0.4% carbon, 0.2% silicon of rebar steel contributing highly undesirable impurities for this very large low carbon, low Si group of steels. This approach runs against the current trend toward less remelting of aluminum scrap into deoxidation aluminum ingots due to mounting energy costs. It is far more cost-effective to directly compact the suitably sized scrap into briquettes and other solids such as "hockey pucks" used extensively by large aluminum scrap generators.

Another approach to steel deoxidation involved low-pressure, binder consolidated large one pound subspherical blends of coarse aluminum chips and highly oxidized ferromanganese fine rejects from ferromanganese producing blast furnaces, using between 8–10% molasses as a binder. This technology suffered from several problems, including the fact that the quality of the fines was so low and variable, and in general too oxidized, that an excessive fraction of the aluminum was consumed in reducing the manganese fines first, resulting in excellent and very predictable manganese recoveries, but less than desirable aluminum yields. Aluminum, being the expensive ingredient, made the overall economics borderline. Optimal aluminum/manganese tap alloying needs also varied from facility to facility and from grade to grade, making it difficult to adjust one composition to these varying needs. A specific blend was required for almost every group of steel grades. At least one publication, attributed the well-known black pencil line defect, very common at that time on the surface of cold-rolled low carbon steel sheets, to manganese fines in contact with deoxidizing aluminum at tap.

Because of the increasing awareness for the need to control and eliminate these impurities in steel, a great deal of activity has been focused on developing systems or techniques that fill this need, none of which have been completely successful. The art teaches that previous generations of metallurgists and steelmakers have been unable to solve the deoxidation aluminum recovery issue at tap and extremely low and inefficient tap aluminum recoveries are ranging from as low at 15% in ultra-low carbon steels, high FeO slags (up to 55%) of the flat roll mini-mills to more acceptable 35–40% yields of controlled carry-over slag volumes and low FeO tap slags in some Basic Oxygen Furnace (BOF) shops. The need still exists for consistent improvement from these indicative numbers, each in their particular environment.

SUMMARY OF THE INVENTION

The invention involves a simple solution to improving aluminum efficiency in the severe environment of the steel producing furnace tapping in the ladle without requiring additional work from the furnace crews.

It is an object of this invention to submerge the deoxidizing aluminum additive in briquette or other compressed form below the molten slag and into the molten steel by increasing its apparent density in order to reduce or preclude its parasitic reaction with the highly oxidizing ladle slag.

It is another object of this invention to provide an aluminum-based deoxidizing agent which does not involve any cost-prohibitive melting.

It is another object of this invention to increase the density of this recycled aluminum scrap or secondary aluminum of a size approximately 4 mesh by down by physical blending with low carbon steel scrap, seconds, off-spec powders or any other unalloyed, recyclable iron (Fe) units all about 4 mesh approximately within the same size range as the aluminum, prior to the conventional briquetting or other shape compacting process such as pressed cylinders known in the trade as "hockey pucks." As used in this invention, the terms briquetting or other shape compacting process are used interchangeably.

It is still another object of this invention to increase the apparent density of the substantially manganese-free aluminum-based additive by physical blending with substantially oxygen-free recycled iron units, both to prevent parasitic reaction of aluminum with iron oxide and to avoid solid $MgO—Al_2O_3$ spinel and $FeO/MnO—Al_2O_3$ hercynite/galaxite spinel aluminate inclusions formation, deleterious to steel castability and quality.

These and other objects of this invention will be evident when viewed in light of the drawings, detailed description, and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
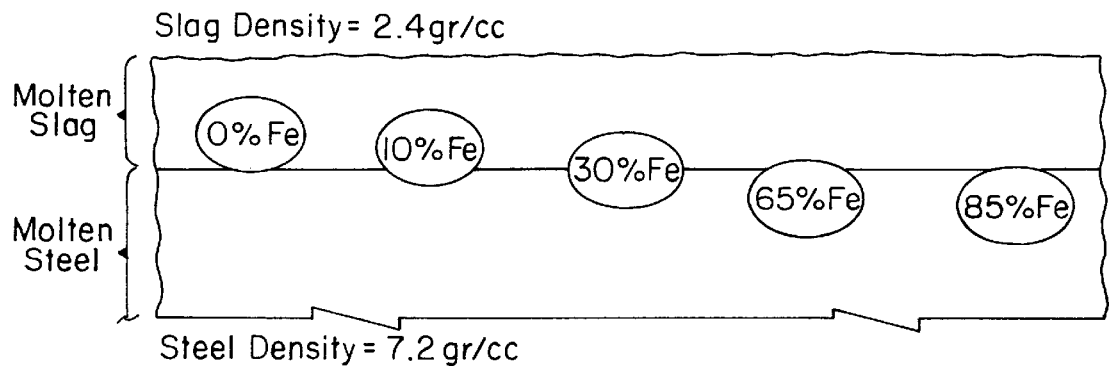
FIG. 1 is a pictorial representation of a slag/molten steel interface depicting a penetration depth of the briquetted aluminum/iron fines as a function of increasing iron content.

Referring now to the drawings wherein the showings are for purposes of illustrating the preferred embodiment of the invention only and not for purposes of limiting the same, FIG.1 shows the value of increasing the apparent density of the aluminum/iron fines briquette to a value in excess of 2.4 g/cc, thereby permitting the aluminum-based deoxidizing additive to sink by gravity difference through the layer of fluid slag, having a density of approximately 2.4 g/cc and to reach the liquid slag-steel interface in which it can dissolve quickly, avoiding parasitic reactions with that slag. These parasitic reactions represent over 90% of all the aluminum losses during steel deoxidation.

As demonstrated by the Prior Art, it is the parasitic reaction of the added metallic aluminum with the molten slag cover that results in most of the yield loss during the tapping of molten steel from Basic Oxygen Furnaces (BOF) or Electric Arc Furnaces (EAF) vessels into the ladle. These chemical reactions can be shown as follows.

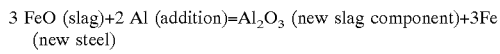
3 FeO (slag)+2 Al (addition)=Al$_2$O$_3$ (new slag component)+3Fe (new steel)

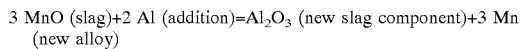
3 MnO (slag)+2 Al (addition)=Al$_2$O$_3$ (new slag component)+3 Mn (new alloy)

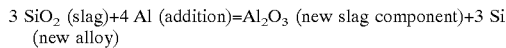
3 SiO$_2$ (slag)+4 Al (addition)=Al$_2$O$_3$ (new slag component)+3 Si (new alloy)

Of the above main reactions, the first one consumes, in general, on the order of at least 75% of all of the aluminum lost to the slag with the normal steelmaking practices. The first two reactions are also, by far, the most exothermic and thus tend to be self-sustaining and even accelerating, provided the reaction products, in particular, the high melting point alumina generated by the reactions, can be reabsorbed by the slag as a low melting point calcium aluminate (CaO—Al$_2$O$_3$), by reaction with fluxed lime carried over from the furnace slag together with the FeO, MnO and SiO$_2$ components.

In order to avoid these parasitic reactions, it is essential to preclude contact between slag and aluminum additive as much as possible. As aluminum and liquid ladle slag have about the same apparent densities, it is not surprising that aluminum ingots or aluminum briquettes with some voids tend to float into the liquid slag exposing them to those parasitic reactions. In fact, depending on the quality of compaction, aluminum briquettes may exhibit various apparent densities all at or below 2.0 g/cc.

Solid low carbon steel at 7.8 g/cc, almost four times the density of the aluminum briquettes, is the ideal candidate to densify the aluminum fines by blending prior to briquetting or compacting to reach apparent briquette densities anywhere between 2.4 and 7.2 g/cc, the density of the liquid steel to be deoxidized.

Depending on compared densities, the depth to which the aluminum-iron briquettes sink through the steel-slag interface prior to dissolution is a function of the amount of added steel. As the amount of added solid steel or iron increases from 0% to higher percentages, the briquettes eventually become sufficiently dense to sink completely through the slag steel interface.

Figure 2:
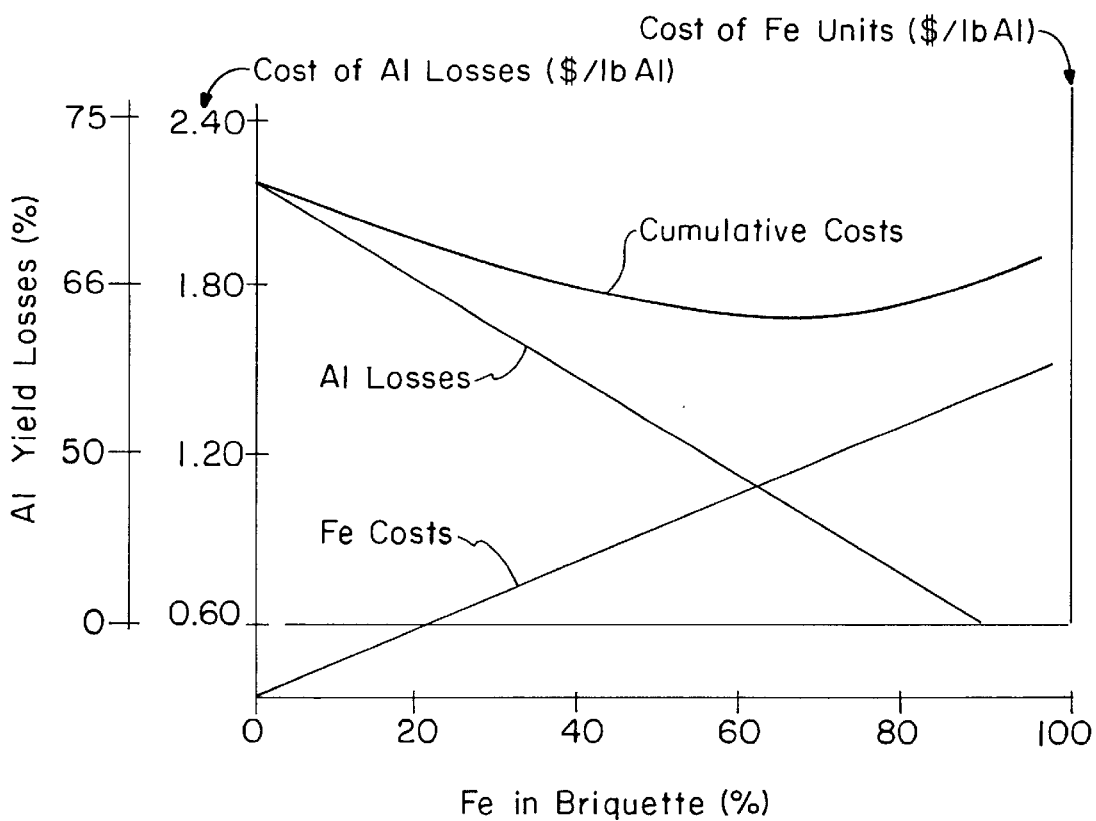
FIG. 2 is a cost analysis and interrelationship of aluminum losses, iron costs and cumulative costs shown as a function of increasing percentages of iron in the briquetted aluminum/iron fines.

The optimal iron content of the briquettes is determined by economic considerations as illustrated in FIG. 2. In general, there is a straight line, inverted relationship between iron densifier content and aluminum losses for a given set of slag FeO+MnO content. The line may vary in slope and from mill to mill and tap carbon to tap carbon. The lower the tap carbon, the higher the FeO, and the steeper the line, or in practical terms, the larger the incentive to increase the iron content of the briquettes. On the other hand, the cost of iron fines is not zero and the steelmaker generally does not recognize the iron unit contribution to the liquid steel. This iron cost grows linearly with the percentage of iron fines and the slope of that line depends on the cost of the iron units. The addition of these two intersecting, inversely sloped cost component lines, produces a curved line with a minimum point. The position of this point in the diagram depends on the respective slopes and position of the two straight cost lines. That minimum should determine the optimum iron content for best economic results in each steel operation.

In practical terms, even small iron additions of the order of 5–15% to the aluminum briquettes may already produce such attractive improvements in aluminum yields that the steelmaking customer may stop at this point, limiting the extra charge weight of the iron in the briquettes and the additional chill effect from the cold iron on his ladle temperature. On the other hand, as shown by the prior art, only large iron contents 65% iron of the ferroaluminum alloy example, yield better than 50% aluminum use reductions.

In an embodiment of this invention, sufficient amounts of iron fines are added to increase the apparent density of metallic aluminum briquette or other compressed shape to about 2.4 g/cc or greater. In a more preferred embodiment, the apparent density of the aluminum-iron briquette or other compressed shape ranges from about 2.4 g/cc to about 7.2 g/cc. In a still more preferred embodiment, the apparent density ranges from about 3.0 g/cc to about 6.5 g/cc for optimum compromise between reduction in aluminum losses and increased cost, charge weight and chill effect of higher iron content. Translated into corresponding iron content, the encompassing range of composition will include from about 5% to about 95% iron. Preferably, the iron content will range from about 10% to about 80%. More preferably, the iron content will range from about 20% to about 70%.

In the preparation of the aluminum-based briquette, specifications for iron fines is flexible dominated by price and availability as well as ease of compaction with the available aluminum scrap fines. Similar considerations apply to the aluminum fines. As one nonlimiting example typical of that usable in the industry today, a physical compaction of fine solids (e.g., those particles that would fall through a 4-mesh screen) is effected, wherein approximately at least 50% of the fines fall through the screen. Though it may be possible to use binders such as molasses, it is preferable to use a binderless briquette, thereby avoiding associated problems of fuming, smoking, moisture, etc. In addition, it is recognized that binders can be a source of carbon which can be undesirable in some steel compositions such as ultra low carbon steels. The briquettes typically used in this invention can be of any size that is easily handled and packaged. Typically, a briquette is between from about 1 to about 5 inches in its largest dimension. In a preferred embodiment, particle size ranges of either the aluminum or the iron will range from about 4 to 200 mesh (preferred that approximately at least 50% of the fines fall within this range of mesh sizes) although both higher and lower mesh sized particles can be incorporated into the briquette.

It is believed that small-sized powders, not too far from subspherical are better candidates than larger ones, in that the larger, more non-spherical the particles are shaped, the more difficult it is for the apparent density of the briquette to reach close to the theoretical density. In other words, voids remaining after the pressure compaction process are smaller and fewer with well sized, subspherical fines than with elongated and/or flat shapes.

Without limiting the choice of raw materials for the purpose of this invention, a current example is shredded aluminum turnings to meet a minimum, determined by hydrogen evolution, of 96% Al and shredded iron or steel turnings and as example, 9 mesh by 20 mesh flat shreds of steel.

Without limiting the choice of equipment for the purpose of this invention, one can use an AC current, variable speed roll briquetter equipped with an AC variable speed vertical screw force feeder. The feeder receives the fines from two surge hoppers one for aluminum and one for iron, each equipped with automatic feed scales. These surge hoppers are followed by one high speed mixing screw ahead of the vertical force feeder into the briquetter. Each surge hopper, in turn is fed by a continuous belt transfer system from the raw materials preparation area.

To describe the sequence of operations, each aluminum and iron raw material is charged through its respective conveyor system into the surge hoppers to be filled. Indicators are incorporated into the surge hoppers to automate the feeding rates. The weigh scales conveyors on each surge hopper discharge a predetermined ratio of aluminum and iron to the high speed mixing screw. If a binder is desired, it should be added at the point of entry to the high speed mixing screw but it is recommended not to exceed 1% in the liquid form. The mixing screw directly charges the mix in the vertical screw which force-feeds it between the two matching briquetter rolls pressurized against each other for optimum compaction of the mix. The rough briquettes are conveyed directly out of the briquetter to a deflashing machine to remove the burrs. At least 80% of the finished briquettes should be retained from an ASTM tumble test.

This invention has been described in detail with reference to specific embodiments thereof, including the respective best modes for carrying out each embodiment. It shall be understood that these illustrations are by way of example and not by way of limitation.

What is claimed is:

1. A process for reducing aluminum usage when using an aluminum-containing deoxidizing agent for the deoxidation of liquid steel is used, comprising the steps of:
   (a) briquetting an aluminum-containing fine with a sufficient amount of an iron-containing, essentially oxide-free fine to a briquette density greater than or equal to about 2.4 g/cc to form a briquetted aluminum-containing deoxidizing additive; and
   (b) adding said briquetted aluminum-containing deoxidizing additive to a liquid steel.

2. The process of claim 1 wherein
   (a) said step of briquetting involves mechanically pressing said aluminum fine with said iron-containing fine with a binder.

3. The process of claim 1 wherein
   (a) said density is greater than or equal to about 2.4 g/cc and less than or equal to about 6.5 g/cc.

4. The process of claim 3 wherein
   (a) said density is greater than or equal to about 3.0 g/cc and less than or equal to about 6.5 g/cc.

5. The process of claim 4 wherein
   (a) at least 50% of said aluminum-containing and iron-containing fines are less than 4 mesh.

6. The process of claim 5 wherein
   (a) at least 50% of said aluminum-containing and iron-containing fines are less than or equal to 4 mesh and greater than or equal to 200 mesh.

7. A process for reducing aluminum usage when using an aluminum-containing deoxidizing agent for the deoxidation of liquid steel is used, comprising the steps of:
   (a) blending an aluminum-containing fine with a sufficient amount of an iron-containing, essentially oxide-free fine to an blended density greater than or equal to about 2.4 g/cc to form a blended aluminum-containing deoxidizing additive;
   (b) compacting said blended aluminum-containing deoxidizing additive; and
   (c) adding said blended aluminum-containing deoxidizing additive to a liquid steel.

8. The process of claim 7 wherein
   (a) said step of compacting involves mechanically pressing said aluminum-containing fine with said iron-containing fine with a binder.

9. The process of claim 7 wherein
   (a) said density is greater than or equal to about 2.4 g/cc and less than or equal to about 6.5 g/cc.

10. The process of claim 9 wherein
    (a) said density is greater than or equal to about 3.0 g/cc and less than or equal to about 6.5 g/cc.

11. The process of claim 10 wherein
    (a) at least 50% of said aluminum-containing and iron-containing fines are less than 4 mesh.

12. The process of claim 11 wherein
    (a) at least 50% of said aluminum-containing and iron-containing fines are less than or equal to 4 mesh and greater than or equal to 200 mesh.

13. A process for reducing aluminum usage when using an aluminum-containing deoxidizing agent for the deoxidation of liquid steel is used, comprising the steps of:
    (a) blending a first component comprising an aluminum-containing fine with a sufficient amount of second component comprising an iron-containing, essentially oxide-free fine to an blended density greater than or equal to about a slag density of molten steel, to form a blended deoxidizing additive;
    (b) compacting said blended deoxidizing additive; and
    (c) adding said blended deoxidizing additive to a liquid steel.

14. The process of claim 13 wherein
    (a) said density is greater than or equal to about 2.4 g/cc.

15. The process of claim 14 wherein
    (a) said step of compacting involves mechanically pressing said first and second components with a binder.

16. The process of claim 14 wherein
    (a) said density is greater than or equal to about 2.4 g/cc and less than or equal to about 6.5 g/cc.

17. The process of claim 16 wherein
    (a) said apparent density is greater than or equal to about 3.0 g/cc and less than or equal to about 6.5 g/cc.

18. The process of claim 17 wherein
    (a) at least 50% of said first and second component fines are less than 4 mesh.

19. The process of claim 18 wherein
    (a) at least 50% of said first and second component fines are less than or equal to 4 mesh and greater than or equal to 200 mesh.

20. The process of claim 19 wherein
    (a) said second component has a density greater than or equal to 7.8.

* * * * *